United States Patent

Da Silva et al.

[11] Patent Number: 5,912,945
[45] Date of Patent: Jun. 15, 1999

[54] X-RAY COMPASS FOR DETERMINING DEVICE ORIENTATION

[75] Inventors: Luiz B. Da Silva, Danville; Dennis L. Matthews, Moss Beach; Joseph P. Fitch, Livermore; Matthew J. Everett, Pleasanton; Billy W. Colston; Gary F. Stone, both of Livermore, all of Calif.

[73] Assignee: Regents of the University of California, Oakland, Calif.

[21] Appl. No.: 08/880,850

[22] Filed: Jun. 23, 1997

[51] Int. Cl.⁶ ..................................................... A61B 17/00
[52] U.S. Cl. .............................................................. 378/205
[58] Field of Search ........................................ 378/205, 1

[56] References Cited

U.S. PATENT DOCUMENTS

| 1,948,552 | 2/1934 | Weber et al. | 378/1 |
| 3,291,988 | 12/1966 | Chope et al. | 250/366 |
| 4,061,924 | 12/1977 | Jacoby et al. | 378/162 |

FOREIGN PATENT DOCUMENTS

| 405285087 | 11/1993 | Japan | 378/1 |

Primary Examiner—David P. Porta
Assistant Examiner—David Vernon Bruce
Attorney, Agent, or Firm—Daryl S. Grzybicki

[57] ABSTRACT

An apparatus and method for determining the orientation of a device with respect to an x-ray source. In one embodiment, the present invention is coupled to a medical device in order to determine the rotational orientation of the medical device with respect to the x-ray source. In such an embodiment, the present invention is comprised of a scintillator portion which is adapted to emit photons upon the absorption of x-rays emitted from the x-ray source. An x-ray blocking portion is coupled to the scintillator portion. The x-ray blocking portion is disposed so as to vary the quantity of x-rays which penetrate the scintillator portion based upon the particular rotational orientation of the medical device with respect to the x-ray source. A photon transport mechanism is also coupled to the scintillator portion. The photon transport mechanism is adapted to pass the photons emitted from the scintillator portion to an electronics portion. By analyzing the quantity of the photons, the electronics portion determines the rotational orientation of the medical device with respect to the x-ray source.

19 Claims, 8 Drawing Sheets

X-RAY COMPASS FOR DETERMINING DEVICE ORIENTATION

The United States Government has rights in this invention pursuant to Contract No. W-7405-ENG-48 between the United States Department of Energy and the University of California, for the operation of Lawrence Livermore National Laboratory.

BACKGROUND OF THE INVENTION

1. Field of the Invention

This invention relates to medical devices. Specifically, the present invention relates to accurate positioning of a medical device.

2. Description of Related Art

During many medical procedures, a medical device is inserted into the patient's body. The medical device is then used to excise, medicate, or otherwise treat, for example, a region, tumor, or other structure within the patient's body. During such a procedure, the medical device is obviously hidden from the view of the medical practitioner. Thus, it can be difficult for the practitioner to know the precise location of the medical device with respect to the region of interest within the patient's body.

With reference now to Prior Art FIG. 1, a schematic cut-away of an artery 100 having a catheter 102 inserted therein is shown. In Prior Art FIG. 1, a tumor 104 is shown located on the right side of artery 100. Many internally-used medical devices, such as catheter 102, have rotational differences. That is, catheter 102 directs a treatment such as, for example, chemotherapy agents, via opening 105 in the side of catheter 102. Hence, when disposed as shown in Prior Art FIG. 1, the chemotherapy agents would be emitted in the direction of arrow 106, instead of towards tumor 104. Thus, in many medical procedures, the medical practitioner needs to know the rotational orientation of the medical device within the patient's body.

In many conventional approaches, the medical practitioner uses a rotational gauge to roughly determine the rotational orientation of the medical device. Such a gauge is typically attached to the medical device at a point where the medical device extends out of the patient's body. However, such rotational gauges only provide a rough estimate of the rotational orientation of the medical device. That is, due to the circuitous path that the medical device may follow within the patient's body, it is very difficult for the medical practitioner to know the precise rotational orientation of the end of the medical device.

In Prior Art FIG. 2, a conventional location determination approach is shown. In the approach of Prior Art FIG. 2, a radiographic element 108 is attached to the end of catheter 102. During the medical procedure, x-rays are used to locate the position of the end of catheter 102 within the patient's body. Although such an approach determines the position of the end of the medical device within the patient's body, such an approach does not determine the rotational orientation of the medical device within the patient's body. Thus, as shown in Prior Art FIG. 2, even though the position of the end of the catheter is known and is located as desired, the rotational orientation of catheter 102 is not as it should be.

Additionally, in some medical procedures it may be necessary to know the azimuthal orientation of the medical device within the patient's body. At present there is no practical method for accurately determining the rotational and/or the azimuthal orientation of the medical device within the patient's body.

Thus, a need exists for a method and apparatus for accurately determining the orientation of a device with respect to an x-ray source.

DISCLOSURE OF THE INVENTION

The present invention provides a method and apparatus for accurately determining the orientation of a medical device with respect to an x-ray source.

Specifically, in one embodiment, the present invention is coupled to a medical device in order to determine the rotational orientation of the medical device with respect to the x-ray source. In such an embodiment, the present invention is comprised of a scintillator portion which is adapted to emit photons upon the absorption of x-rays emitted from the x-ray source. An x-ray blocking portion is coupled to the scintillator portion. The x-ray blocking portion is disposed so as to vary the quantity of x-rays which penetrate the scintillator portion based upon the particular rotational orientation of the medical device with respect to the x-ray source. A photon transport mechanism is also coupled to the scintillator portion. The photon transport mechanism is adapted to pass the photons emitted from the scintillator portion to an electronics portion. By analyzing the quantity of the photons, the electronics portion determines the rotational orientation of the medical device with respect to the x-ray source. Although the following discussion pertains to use of the present invention with a medical device, the present invention is well suited to determining the orientation of numerous other types of devices besides medical devices. However, for purposes of clarity and illustration, the following discussion will describe the present invention employed in conjunction with a medical device.

In another embodiment, the present invention is coupled to a medical device in order to determine the azimuthal orientation of the medical device with respect to the x-ray source. In this embodiment, the present invention is comprised of a scintillator portion which is adapted to emit photons upon the absorption of x-rays emitted from the x-ray source. An x-ray blocking portion is coupled to the scintillator portion. The x-ray blocking portion is disposed so as to vary the quantity of x-rays which penetrate the scintillator portion based upon the particular azimuthal orientation of the medical device with respect to the x-ray source. A photon transport mechanism is also coupled to the scintillator portion. The photon transport mechanism is adapted to pass the photons emitted from the scintillator portion to an electronics portion. By analyzing the quantity of the photons, the electronics portion determines the azimuthal orientation of the medical device with respect to the x-ray source.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

Prior Art

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 3:
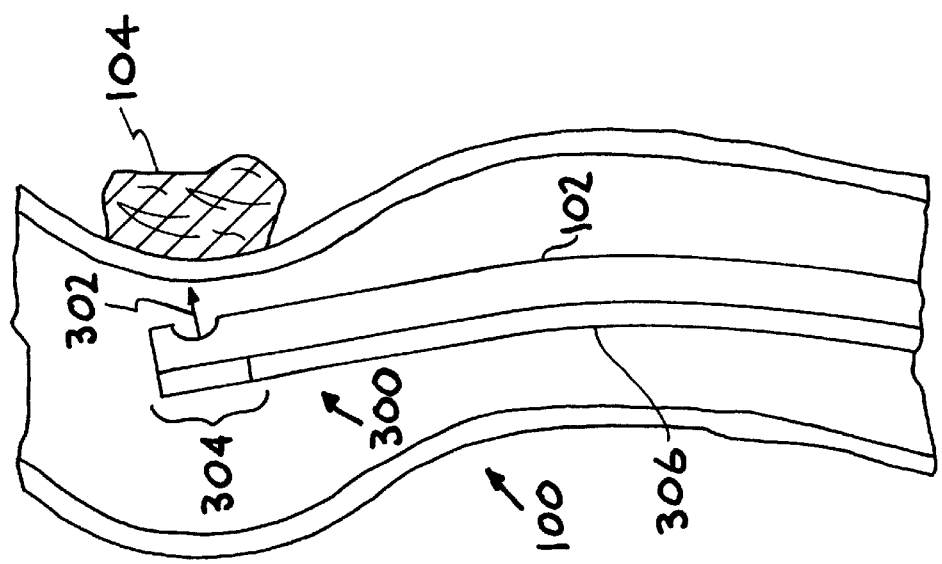
FIG. 3 is a side schematic view of an artery containing a catheter having the present invention coupled thereto.

With reference now to FIG. 3, a side schematic view of an artery 100 containing a catheter 102 having the present invention 300 coupled thereto is shown. (It will be understood that FIG. 3, and the following Figures are drawn for purposes of clarity and illustration, and are not drawn to scale.) The present invention allows a medical practitioner to accurately determine the rotational orientation of a medical device. In so doing, the medical practitioner is able to insure, for example, that a given treatment is applied in the desired direction. Thus, when employing the present invention, a medical practitioner is able, for example, to deliver chemotherapy agents towards a desired target. In the example of FIG. 3, unlike the prior art, a medical practitioner is able to determine the rotational orientation of the medical device, and deliver the chemotherapy agents in the direction shown by arrow 302 towards tumor 104.

Referring still to FIG. 3, the present invention 300 is comprised of a positionally dependent photon source portion 304, which is coupled to a photon transport mechanism 306. An electronics portion, not shown in FIG. 3, receives photons from photon transport mechanism 306, and calculates the rotational orientation of the present invention with respect to a x-ray source, not shown in FIG. 3. A more detailed description of the structure and method of using the present invention is given below.

Figure 1:
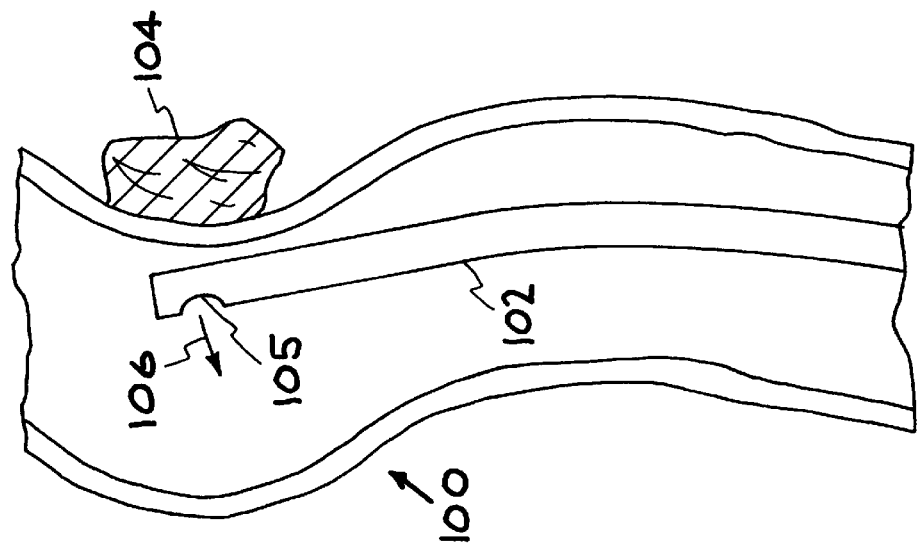
FIG. 1 is a schematic cut-away of an artery having a catheter inserted therein.
Figure 2:
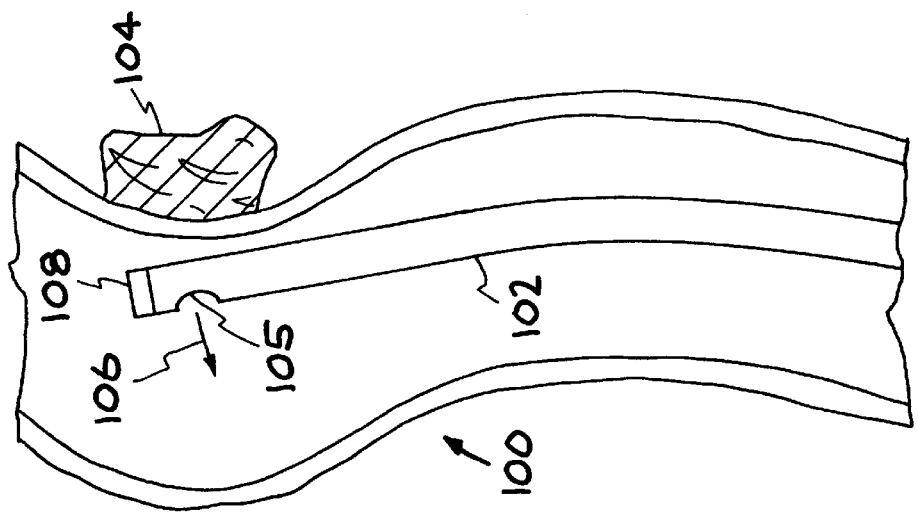
FIG. 2 is a schematic cut-away of an artery having a radiographic element-tipped catheter inserted therein.
Figure 4:
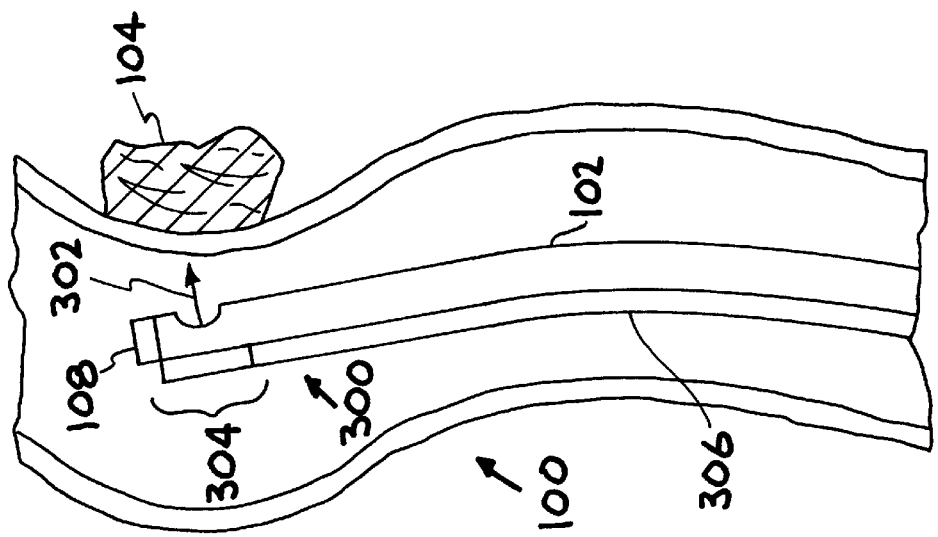
FIG. 4 is a side schematic view of an artery containing a radiographic element-tipped catheter having the present invention coupled thereto.

As shown in FIG. 4, the present invention 300 is also well suited for use with a catheter 102 having radiographic element 108 attached thereto. In such an embodiment, positionally dependent photon source portion 304 of the present invention 300 must be located either above or below radiographic element 108.

Although chemotherapy agent emitting catheter is mentioned in the preceding example, and in the following detailed description, the present invention is well suited for use with numerous other medical devices used for numerous other types of medical procedures. Such medical devices include, but are not limited to: standard medical catheters; guide wires; surgical laser fibers; angioplasty balloons; intravascular ultra sound probes; colonoscopes; and numerous other x-ray guided medical devices. Medical procedures for which the present invention is well suited include, but are not limited to: angioplasty; stroke treatment; aneurysm; ateriovenous malformations; ophthalmic surgery; laparoscopic surgery; arthroscopic surgery; treatment of colorectal disorders; sinus disorders; ear surgery; pneumothoracic surgery; spinal surgery; bladder surgery; esophageal surgery; uteral disorders; and numerous other treatments which require x-ray imaging to accurately position a medical device inside a patient's body.

Figure 5:
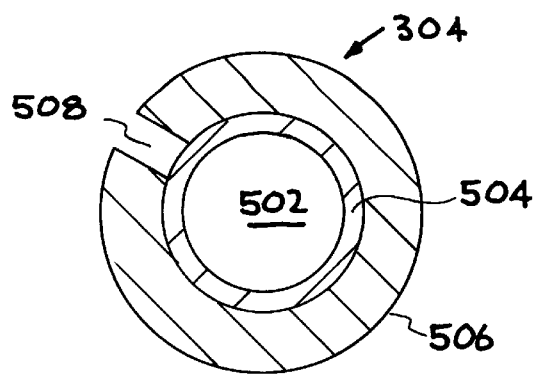
FIG. 5 is a top view of one embodiment of the present invention.

With reference now to FIG. 5, a top view of one embodiment of the present invention is shown. In the present embodiment, positionally dependent photon source portion 304 is comprised of a scintillator portion 502, a surrounding aluminized portion 504, and an x-ray blocking portion 506. In the present embodiment, scintillator portion 502 is comprised of materials which emit photons (i.e. optical light) upon absorbing x-rays. Such materials include but are not limited to a gadolinium-based $Gd_2O_2S$, cesium iodide (CsI), sodium iodide (NaI), or zinc telluride (ZnTe). In the present embodiment, scintillator portion 502 has a height of approximately 100–5000 microns, and a diameter of approximately 50–400 microns. Although specific dimensions are recited above, the present invention is also well suited to forming a scintillator portion having various other dimensions.

Referring still to FIG. 5, aluminized portion 504 is comprised of a layer of aluminum which is disposed peripherally surrounding scintillator portion 502. Aluminized portion 504 reflects photons generated by scintillator portion 502 towards photon transport mechanism 306 of FIGS. 3 and 4. In the present embodiment, aluminized portion 504 has a thickness of approximately 1000 angstroms. Although specific dimensions are recited above, the present invention is also well suited to forming an aluminized portion having various other dimensions.

Referring again to FIG. 5, in the present embodiment, x-ray blocking portion 506 peripherally surrounds at least a part of scintillator portion 502 and aluminized portion 504. X-ray blocking portion 506 is comprised of a high Z material. That is, x-ray blocking portion 506 is comprised of material having a relatively high number of protons. Hence, x-ray blocking portion substantially prevents x-rays from reaching scintillator portion 502. High Z materials include for example, tungsten (W), gold (Au), and the like. In the present invention, x-ray blocking portion 506 is disposed with respect to scintillator portion 502 so as to vary the quantity of x-rays which can penetrate scintillator portion 502. A more detailed description of the function of x-ray blocking port on of the present invention is given below in conjunction with FIGS. 8–10.

Figure 6:
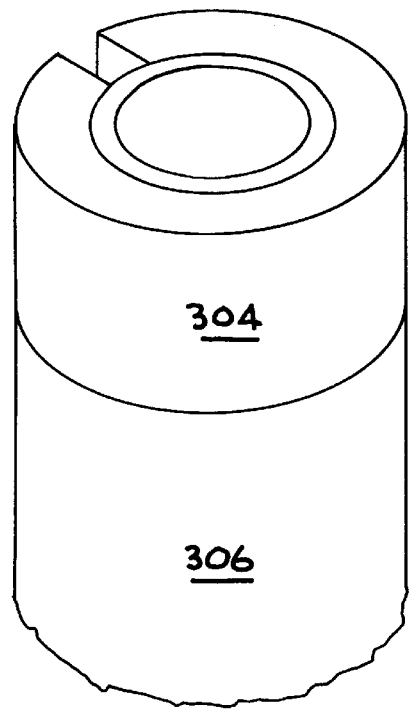
FIG. 6 is a perspective view of the embodiment of the present invention shown in FIG. 5.

Referring now to FIG. 6, a perspective view of the invention of FIG. 5 is shown. As shown in FIG. 6, photon transport mechanism 306 is coupled to positionally dependent photon source portion 304. In the present invention, photon transport mechanism 306 is adapted to pass photons emitted from scintillator portion 502 to a desired location such as, for example, an electronics portion, not shown. In the present embodiment, photon transport mechanism is comprised of one or more optical fibers. The optical fibers typically have a diameter in the range of 50–400 microns.

Figure 7:
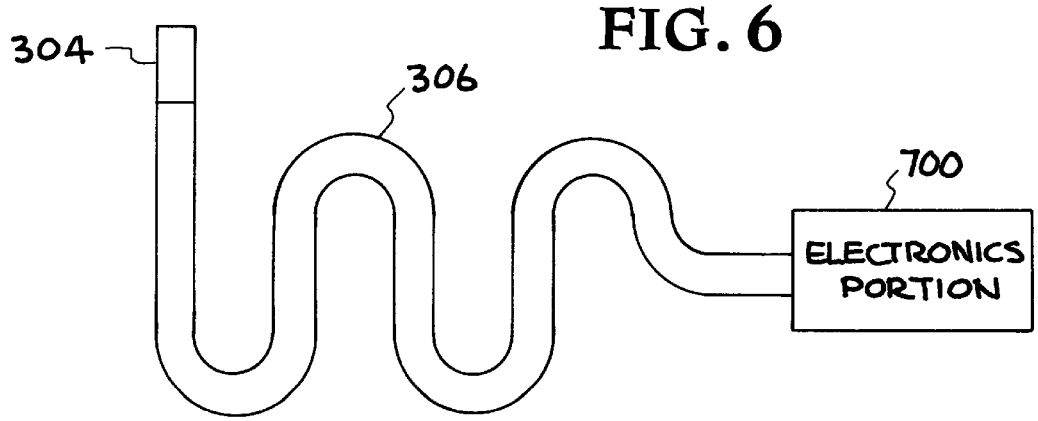
FIG. 7 is a schematic diagram of an embodiment of the present invention in which an electronics portion is coupled to the photon transport mechanism.

With reference now to FIG. 7, a schematic diagram of an embodiment of the present invention is shown in which an electronics portion 700 is coupled to the photon transport mechanism 306. In the present embodiment, electronics portion 700 is comprised of one or more optical photomultipliers and photon counting electronics. The photon counting electronics measure the quantity of the received photons, and use the information to determine the rotational orientation of the present invention with respect to an x-ray source.

Figure 8:
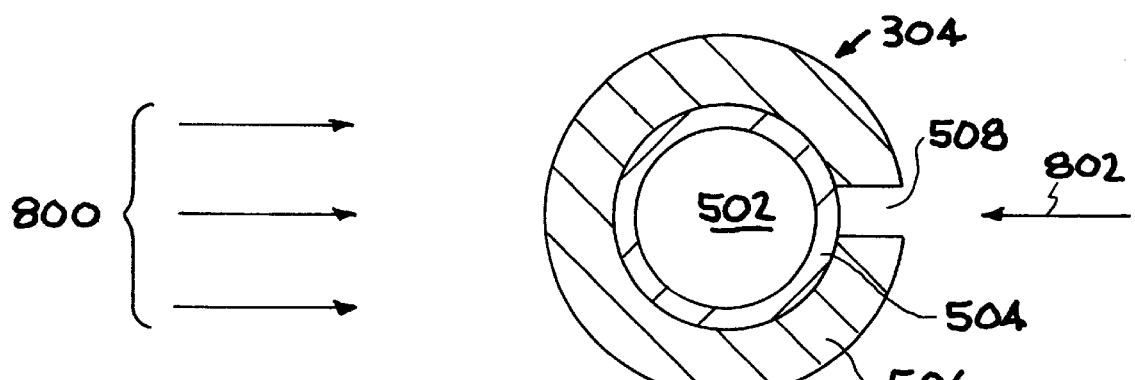
FIG. 8 is a top view of one possible rotational orientation of one embodiment of the present invention with respect to an x-ray source.

With reference next to FIG. 8, a top view of one possible arrangement of the present invention is shown. It will be understood that during actual use, the present invention is coupled to a medical device. Additionally, the present invention is coupled to the medical device such that the orientation of the present invention with respect to the medical device is known. In FIG. 8, positionally dependent photon source portion 304 of the present invention is rotated as shown. That is, opening 508 in x-ray blocking portion 506 is disposed opposite x-ray source 800. In such a rotational arrangement, scintillator portion 502 will only absorb a substantial amount of x-rays when the x-rays are traveling in the direction indicated by arrow 802. That is, only x-rays traveling in the direction indicated by arrow 802 will be able to pass through opening 508 and be absorbed by scintillator portion 502. Hence, x-ray blocking portion 506 substantially prevents all other x-rays reaching scintillator portion 502.

Figure 9:
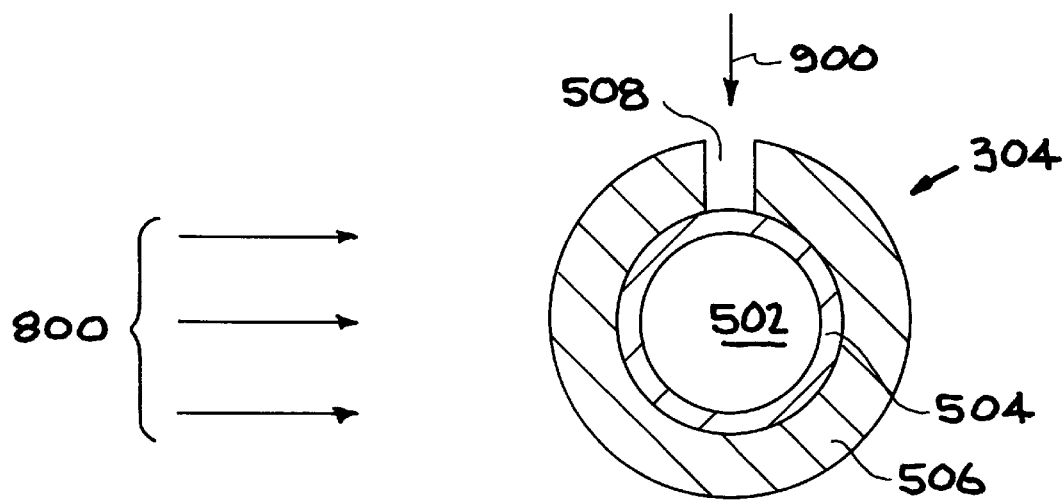
FIG. 9 is a top view of another possible rotational orientation of one embodiment of the present invention with respect to an x-ray source.

With reference now to FIG. 9, positionally dependent photon source portion 304 of the present invention is rotated as shown. That is, opening 508 in x-ray blocking portion 506 is oriented 90 degrees from x-ray source 800. In such a rotational arrangement, scintillator portion 502 will only absorb a substantial amount of x-rays when the x-rays are traveling in the direction indicated by arrow 900. That is, only x-rays traveling in the direction indicated by arrow 900 will be able to pass through opening 508 and be absorbed by scintillator portion 502. Hence, x-ray blocking portion 506 substantially prevents all other x-rays reaching scintillator portion 502.

Figure 10:
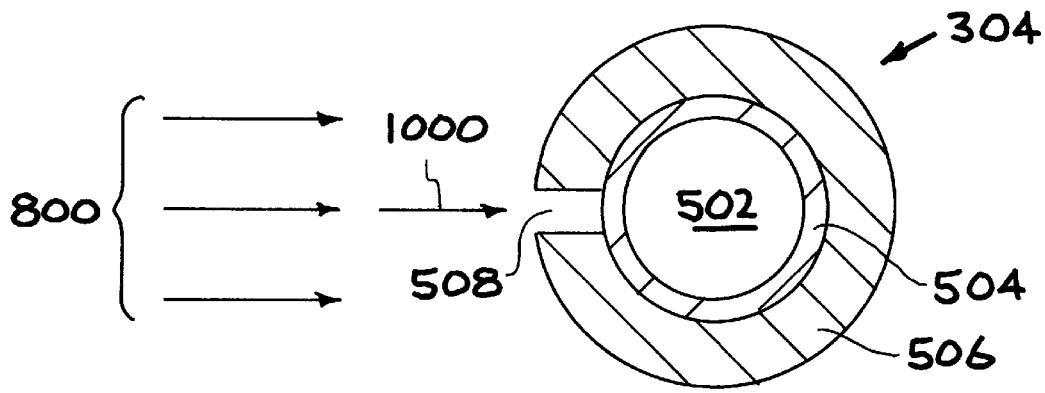
FIG. 10 is a top view of still another possible rotational orientation of one embodiment of the present invention with respect to an x-ray source.

In FIG. 10, positionally dependent photon source portion 304 of the present invention is rotated as shown. That is, opening 508 in x-ray blocking portion 506 is disposed facing x-ray source 800. In such a rotational arrangement, scintillator portion 502 will absorb a substantial amount of x-rays because the x-rays are traveling in the direction indicated by arrow 1000. Hence, opening 508 allows a substantial number of x-rays to reach scintillator portion 502.

With reference still to FIG. 10, it will be understood that in the present embodiment, increasing the thickness of x-ray blocking layer 506 increases x-ray collimation. Thus, by increasing the thickness of x-ray blocking portion 506, the present invention further limits the critical angle range within which the present invention must be rotated before a substantial number of x-rays will reach scintillator portion 502. However, in the present embodiment, increasing the thickness of x-ray blocking portion 506 will also increase the size of positionally dependent photon source 304. Thus, when the size of the present positionally dependent photon source portion must be limited (e.g. in narrow arteries, veins, and the like), and when greater collimation is desired, opening 508 must instead be reduced.

Figure 11:
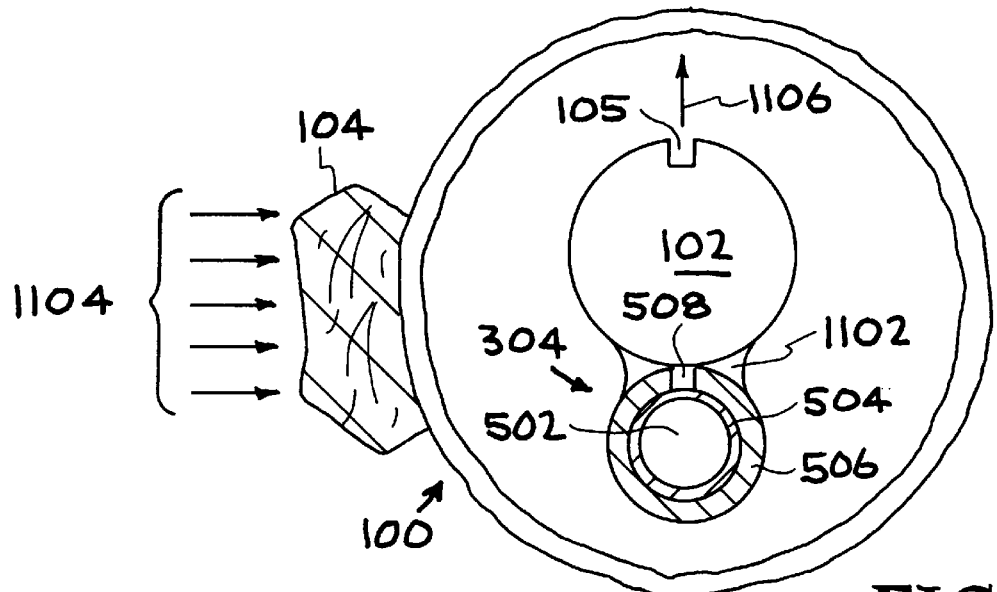
FIG. 11 is a top view of the present invention coupled, via an interface mechanism, to a catheter which is disposed within an artery proximate to a tumor.

With reference now to FIG. 11, another illustration of the present invention during operation is shown. In the embodiment of FIG. 11, the present invention is coupled, via interface mechanism 1102, to catheter 102 which is disposed within an artery 100 proximate to a tumor 104. In the present embodiment, interface mechanism 1102 is comprised, for example, of medical quality adhesive. In the present embodiment, the present invention is coupled to catheter 102 such that opening 508 in x-ray blocking portion 506 is aligned with opening 105 in catheter 102. Although such an alignment is shown in the present embodiment, the present invention is well suited to being coupled to catheter 102 in numerous other locations and alignments.

Referring still to FIG. 11, the patient's body is subjected to x-rays, typically shown as 1104, emitted in the direction shown from an x-ray source, not shown. Thus, when catheter 102 has a rotational orientation with respect to an x-ray source as is shown in FIG. 11, scintillator portion 502 will not absorb a substantial number of x-rays. Hence, electronics portion 700 of FIG. 7, would register a very low number of received photons. Such a low number of received photons would indicate to the medical practitioner, that the catheter was not in a desired rotational orientation with respect to the x-ray source. That is, in the rotational orientation shown in FIG. 11, chemotherapy agents expelled from catheter 102 through opening 105 would be emitted in the direction indicated by arrow 1106 and not towards tumor 104.

Figure 12:
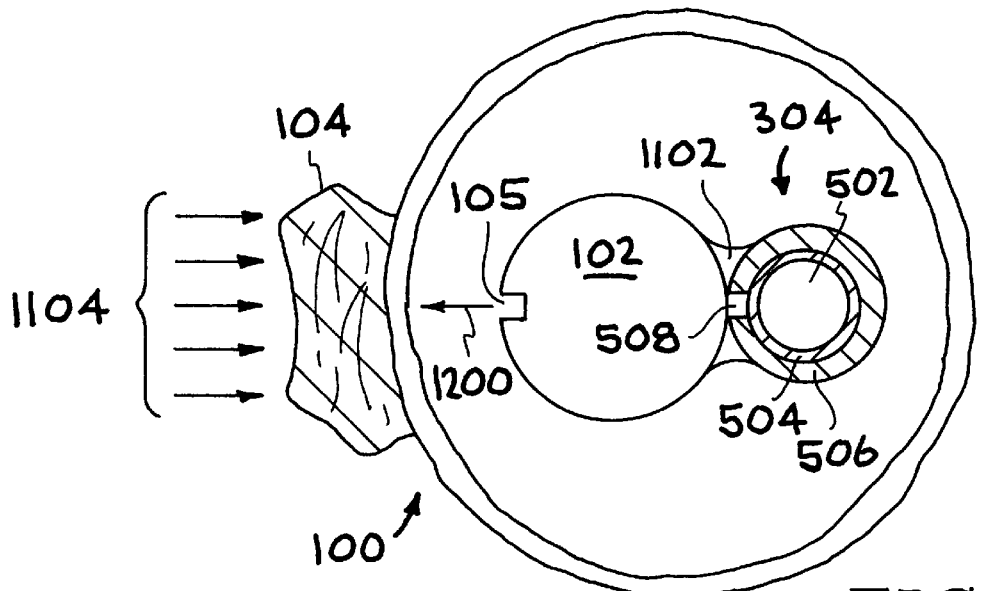
FIG. 12 is a top view of the invention of FIG. 11 in a different rotational orientation.

With reference next to FIG. 12, the present invention is shown with catheter 102 having an optimal rotational orientation. That is, chemotherapy agents expelled from catheter 102 through opening 105 would be emitted in the direction indicated by arrow 1200 towards tumor 104. When catheter 102 has a rotational orientation with respect to an x-ray source as is shown in FIG. 12, scintillator portion 502 will absorb maximum number of x-rays. Hence, electronics portion 700 of FIG. 7, would register a very high (i.e. maximum number of received photons). Such a high/ maximum number of received photons would indicate to the medical practitioner, that the catheter was now in a desired rotational orientation with respect to the x-ray source. In one embodiment of the present invention, electronics portion 700 provides an audible signal when the number of received photons is maximized. Upon hearing the audible signal, the medical practitioner expels the chemotherapy agents from catheter 102. Although an audible signal is produced in the present embodiment, electronics portion 700 of the present invention is well suited to using various other methods the indicate when a desired rotational orientation is reached. Such methods include, but are not limited to: displaying a graphic signal or image, providing a continuous tone which reaches a peak at certain rotational orientation, and the like.

Reference still to FIG. 12, although catheter 102 is disposed between the x-ray source and the present invention, typical medical imaging x-rays having an energy in the range of 50–90 KeV will penetrate catheter 102. Furthermore, such x-rays will also penetrate aluminized portion 504 and reach scintillator portion 502 when the present invention has proper rotational orientation.

Figures 13, 14:
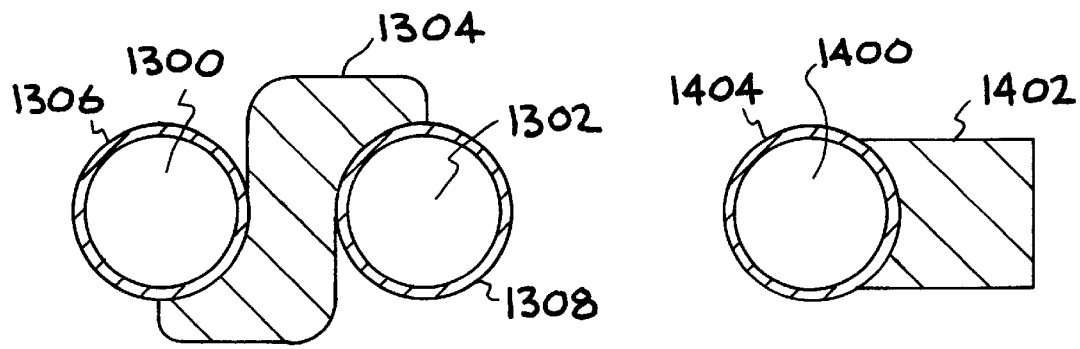
FIG. 13 is a top view of another embodiment of the present invention in which multiple scintillator portions are coupled to respective photon transport mechanisms.
FIG. 14 is a top view of another embodiment of the present invention in which an x-ray blocking portion is present only along a small portion of the periphery of a scintillator portion.

Referring now to FIG. 13, another embodiment of the present invention is shown in which two scintillator portions 1300 and 1302 are employed. An x-ray blocking portion 1304 is disposed between scintillator portions 1300 and 1302. In the present embodiment, each of scintillator portions 1300 and 1302 is peripherally surrounded by an aluminizing region 1306 and 1308, respectively. In such an embodiment, each of scintillator portions 1300 and 1302 has a separate photon transport mechanism coupled thereto. The use of separate photon transport mechanisms allows the multi-channel analyzer of electronics portion 700 of FIG. 7 to separately determine the number of photons generated in each of scintillators 1300 and 1302. By measuring the number of received photons generated by each of scintillator portions 1300 and 1302, electronics portion 700 is able to accurately determine the rotational orientation of the embodiment of FIG. 13. That is, instead of just determining when a maximum number of photons is received, as in the embodiment of FIGS. 5 and 6, for example, the embodiment of FIG. 13 provides a constant indication of its rotational orientation with respect to an x-ray source.

With reference now to FIG. 14 yet another embodiment of the present invention is shown in which a scintillator portion 1400 has an x-ray blocking portion 1402 coupled thereto. In the present embodiment, an aluminizing region 1404 peripherally surrounds scintillator portion 1400. In the present embodiment, in the presence of x-rays, scintillator portion 1400 will absorb x-rays and produce visible photons unless x-ray blocking portion is disposed between an x-ray source and scintillator portion 1400. Thus, the present embodiment is employed to detect a nulling or minimization of the generation of photons by scintillator portion 1400. That is, electronics portion 700 of FIG. 7, will determine when the output from the embodiment of FIG. 14 is minimized. At that point, it will be understood that the present invention has a rotational orientation such that x-ray blocking portion 1402 disposed between the x-ray source and scintillator portion 1400.

Figure 15:
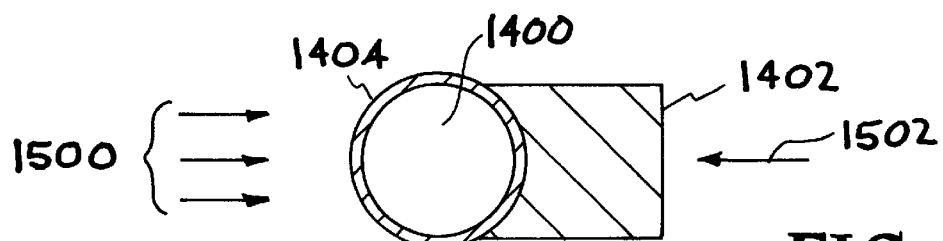
FIG. 15 is a top view of one possible rotational orientation of the embodiment of FIG. 14 with respect to an x-ray source.

With reference next to FIG. 15, a top view of one possible arrangement of the embodiment of FIG. 14 is shown. It will be understood that during actual use, the present invention is coupled to a medical device. Additionally, the present invention is coupled to the medical device such that the orientation of the present invention with respect to the medical device is known. In FIG. 15, positionally dependent photon source portion 1400 of the present invention is rotated as shown. That is, x-ray blocking portion 1402 is disposed opposite x-ray source 1500. In such a rotational arrangement, x-ray blocking portion 1402 will only block a substantial amount of x-rays when the x-rays are traveling in the direction indicated by arrow 1502. Hence, in the depicted rotational orientation, x-ray blocking portion 1402 does not substantially block x-rays from reaching scintillator portion 1400.

Figure 16:
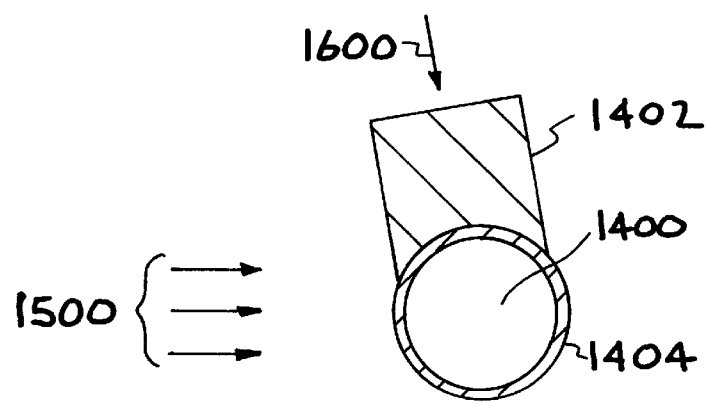
FIG. 16 is a top view of another rotational orientation of the embodiment of FIG. 14 with respect to an x-ray source.

With reference now to FIG. 16, positionally dependent photon source portion 1400 of the present invention is rotated as shown. That is, x-ray blocking portion 1402 is oriented approximately 80 degrees from x-ray source 1500. In such a rotational arrangement, x-ray blocking portion 1402 will only block a substantial amount of x-rays when the x-rays are traveling in the direction indicated by arrow 1600. Hence, x-ray blocking portion 1402 still does not substantially block x-rays from reaching scintillator portion 1400.

Figure 17:
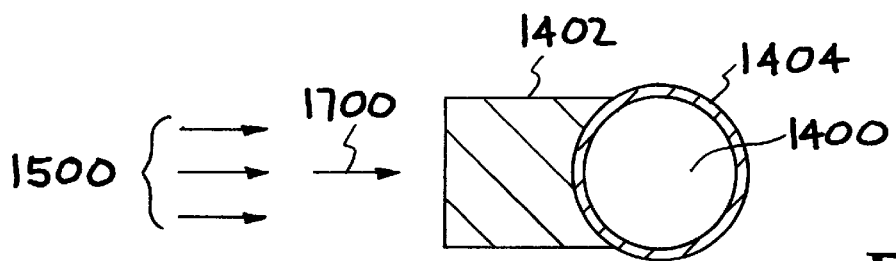
FIG. 17 is a top view of still another possible rotational orientation of the embodiment of FIG. 14 with respect to an x-ray source.

In FIG. 17, positionally dependent photon source portion 1400 of the present invention is rotated as shown. That is, x-ray blocking portion 1402 is disposed between x-ray source 1500 and scintillator portion 1400. In such a rotational orientation, x-ray blocking portion 1402 will block a substantial amount of x-rays, because the x-rays are traveling in the direction indicated by arrow 1700. Hence, a minimized number of x-rays reach scintillator portion 1400. In such an embodiment, electronics portion 700 of FIG. 7 provides, for example, an audible signal when the number of received photons is minimized. Upon hearing the audible signal, the medical practitioner knows that the medical device to which the present invention is coupled, has a rotational orientation such that x-ray blocking portion 1402 is disposed between the x-ray source and scintillator portion 1400.

Figure 18:
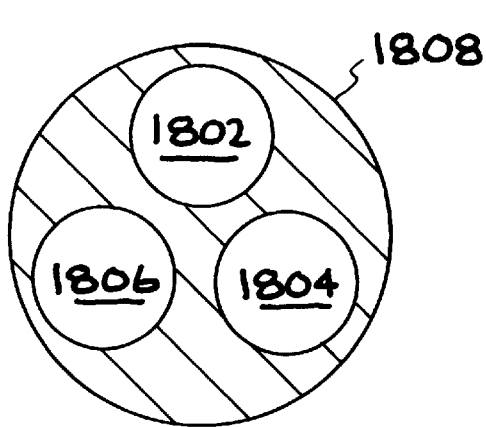
FIG. 18 is a top view of another embodiment of the present invention is which three scintillator regions are surrounded by a spherical mass of x-ray blocking material.

With reference now to FIG. 18, another embodiment of the present invention is shown in which three scintillator portions are surrounded by a cylindrical mass of x-ray blocking material 1808. As in the embodiment of FIG. 13, each of scintillator portions 1802, 1804, and 1806 has a separate photon transport mechanism coupled thereto. The use of separate photon transport mechanisms allows the multi-channel analyzer of electronics portion 700 of FIG. 7 to separately determine the number of photons generated in each of scintillators 1802, 1804, and 1806. By measuring the number of received photons generated by each of scintillator portions 1802, 1804, and 1804 electronics portion 700 is able to accurately determine the rotational orientation of the embodiment of FIG. 18. That is, instead of just determining when a maximum or minimum number of photons is received, as in the embodiment of FIGS. 5, 6, or 14, for example, the embodiment of FIG. 18 provides a constant indication of its rotational orientation with respect to an x-ray source.

Figure 19:
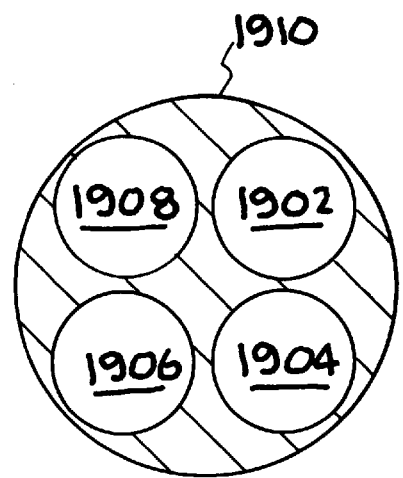
FIG. 19 is a top view of still another embodiment of the present invention in which four scintillator regions are surrounded by a spherical mass of x-ray blocking material.

FIG. 19 shows still another embodiment of the present invention in which four scintillator regions 1902, 1904, 1906, and 1908 are surrounded by a cylindrical mass of x-ray blocking material 1910. As in the embodiment of FIG. 18, each of scintillator portions 1902, 1904, 1906, and 1908 has a separate photon transport mechanism coupled thereto. The use of separate photon transport mechanisms allows the multi-channel analyzer of electronics portion 700 of FIG. 7 to separately determine the number of photons generated in each of scintillators 1902, 1904, 1906, and 1908. Thus, the embodiment of FIG. 19 is able to provide a constant indication of its rotational orientation with respect to an x-ray source.

Figure 20:
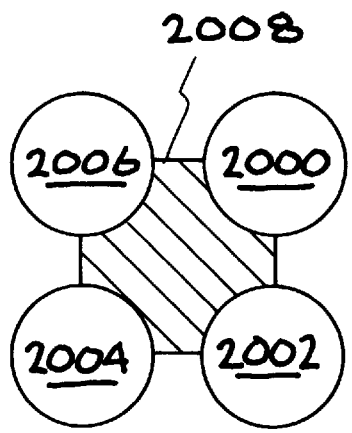
FIG. 20 shows another embodiment of the present invention in which four scintillator regions surround a mass of x-ray blocking material.

FIG. 20 shows another embodiment of the present invention in which four scintillator regions 2000, 2002, 2004, and 2006 surround a mass of x-ray blocking material 2008. As in the embodiment of FIGS. 18 and 19, each of scintillator portions 2000, 2002, 2004, and 2006 has a separate photon transport mechanism coupled thereto. The use of separate photon transport mechanisms allows the multi-channel analyzer of electronics portion 700 of FIG. 7 to separately determine the number of photons generated in each of scintillators 2000, 2002, 2004, and 2006. Thus, the embodiment of FIG. 20 is able to provide a constant indication of its rotational orientation with respect to an x-ray source. Additionally, the embodiment of FIG. 20 is an extremely compact design, thereby rendering it well suited for use in environments where space is limited.

Figure 21:
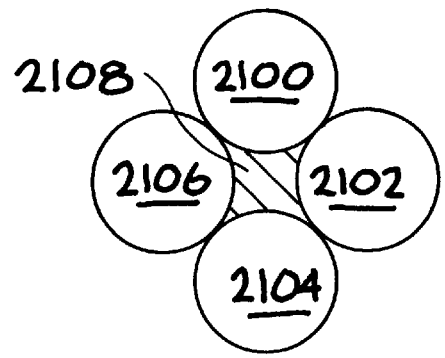
FIG. 21 is yet another embodiment of the present invention in which four scintillator regions are very tightly packed around a mass of x-ray blocking material.

With reference next to FIG. 21 yet another embodiment of the present invention in which four scintillator regions 2100, 2102, 2104, and 2106 are very tightly packed around a mass of x-ray blocking material 2108. As in the embodiment of FIGS. 18 and 19, each of scintillator portions 2100, 2102, 2104, and 2106 has a separate photon transport mechanism coupled thereto. The use of separate photon transport mechanisms allows the multi-channel analyzer of electronics portion 700 of FIG. 7 to separately determine the number of photons generated in each of scintillators 2100, 2102, 2104, and 2106. Thus, the embodiment of FIG. 21 is able to provide a constant indication of its rotational orientation with respect to an x-ray source. Additionally, the embodiment of FIG. 21, like the embodiment of FIG. 20, is an extremely compact design, thereby rendering it well suited for use in environments where space is limited. Additionally, although specific designs for determining rotational orientation in accordance with the present invention are shown in the preceding figures, the present invention is well suited to various other configurations too numerous to be described and illustrated herein.

Figure 22:
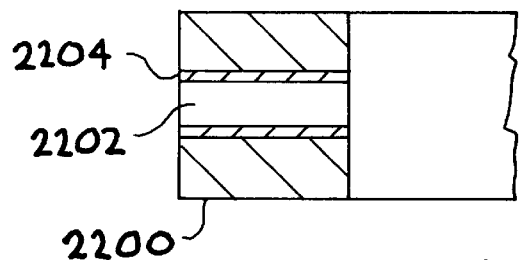
FIG. 22 is a side sectional view of still another embodiment of the present invention adapted for indicating azimuthal orientation with respect to an x-ray source.

With reference now to FIG. 22, a side sectional view of still another embodiment of the present invention adapted for indicating azimuthal orientation with respect to an x-ray source is shown. In the present embodiment, an annular x-ray blocking region 2200 peripherally surrounds a cylindrical scintillator portion 2202. Also, in the present embodiment, cylindrical scintillator portion 2202 is coated with an aluminizing layer 2204.

Figure 23:
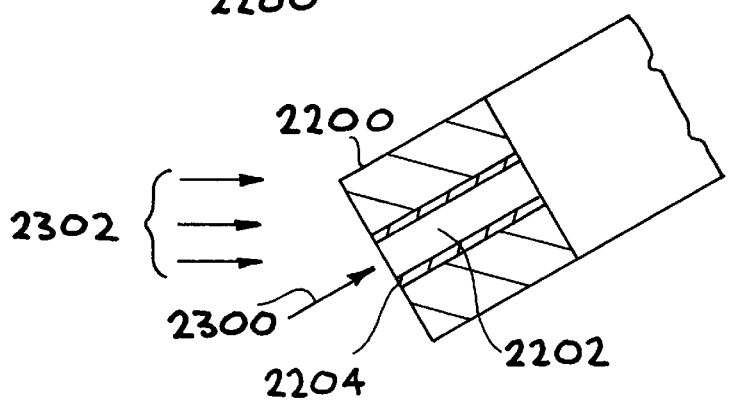
FIG. 23 is a side sectional view of one possible azimuthal orientation of the embodiment of FIG. 22 with respect to an x-ray source.

Referring next to FIG. 23, a side sectional view of one possible azimuthal orientation of the embodiment of FIG. 22 is shown. It will be understood that during actual use, the present invention is coupled to a medical device. Additionally, the present invention is coupled to the medical device such that the orientation of the present invention with respect to the medical device is known. In FIG. 23, the present invention is angled downward as shown, such that x-ray blocking portion 2200 blocks a portion of the x-rays 2302 emanating from an x-ray source, not shown. In the present embodiment, a substantial amount of x-rays 2302 will be absorbed by scintillator portion 2202 only when the x-rays are traveling in the direction indicated by arrow 2300. Hence, in the depicted azimuthal orientation, x-ray blocking portion 2200 will prevent a substantial portion of the x-rays from reaching scintillator portion 2202.

Figure 24:
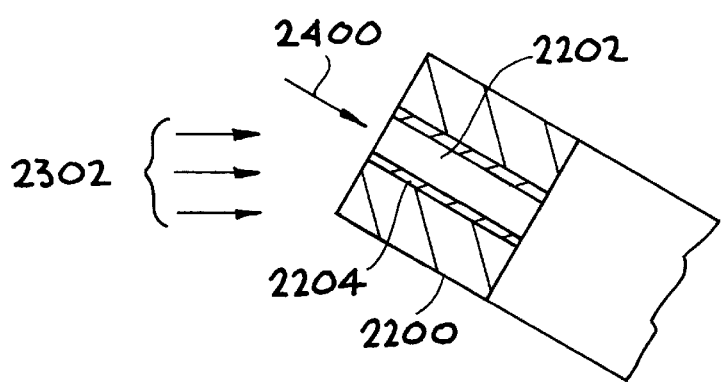
FIG. 24 is a side sectional view of another azimuthal orientation of the embodiment of FIG. 22 with respect to an x-ray source.

With reference now to FIG. 24, a side sectional view of another possible azimuthal orientation of the embodiment of FIG. 22 is shown. In FIG. 24, the present invention is angled upward as shown, such that x-ray blocking portion 2200 blocks a portion of the x-rays 2302 emanating from an x-ray source, not shown. In the present embodiment, a substantial amount of x-rays 2302 will be absorbed by scintillator portion 2202 only when the x-rays are traveling in the direction indicated by arrow 2400. Hence, in the depicted azimuthal orientation, x-ray blocking portion 2200 still prevents a substantial portion of the x-rays from reaching scintillator portion 2202.

Figure 25:
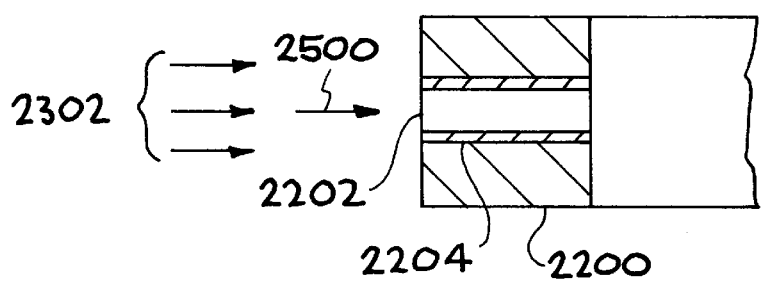
FIG. 25 is a side sectional view of still another possible azimuthal orientation of the embodiment of FIG. 22 with respect to an x-ray source.

Referring now to FIG. 25, a side sectional view of another possible azimuthal orientation of the embodiment of FIG. 22 is shown. In such an azimuthal orientation, x-ray blocking portion 2200 will not prevent a substantial amount of x-rays 2302 from reaching scintillator portion 2202, because the x-rays are traveling in the direction indicated by arrow 2500. Hence, a maximized number of x-rays reach scintillator portion 2202. In such an embodiment, electronics portion 700 of FIG. 7 provides, for example, an audible signal when the number of received photons is maximized. Upon hearing the audible signal, the medical practitioner knows that the medical device to which the present invention is coupled, has an azimuthal orientation such that x-ray blocking portion 2200 is not disposed between the x-ray source and scintillator portion 2202. Although such a specific design for determining azimuthal orientation in accordance with the present invention, is shown in the FIGS. 22–25, the present invention is well suited to various other configurations too numerous to be described and illustrated herein.

Thus, the present invention provides a method and apparatus for accurately determining the orientation of a medical device with respect to an x-ray source.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. An apparatus for determining the orientation of a device with respect to an x-ray source, said apparatus comprising:

a scintillator portion, said scintillator portion adapted to generate photons upon the absorption of x-rays emitted from said x-ray source;

an x-ray blocking portion coupled to said scintillator portion, said x-ray blocking portion disposed so as to substantially prevent x-rays from penetrating said scintillator portion when said x-ray blocking portion is disposed between said x-ray source and said scintillator portion; and a photon transport mechanism coupled to said scintillator portion, said photon transport mechanism adapted to pass said photons generated by said scintillator portion to a desired location.

2. The apparatus of claim 1 further comprising:

an aluminized portion disposed between said scintillator portion and said x-ray blocking portion, said aluminized portion adapted to increase the number of said generated photons which pass into said photon transport mechanism.

3. The apparatus of claim 1 further wherein said scintillator portion is comprised of a photon generating material selected from the group consisting of $Gd_2O_2S$, CsI, NaI and ZnTe.

4. The apparatus of claim 1 further wherein said x-ray blocking portion is comprised of a high Z material.

5. The apparatus of claim 1 wherein said photon transport mechanism is comprised of at least one optical fiber.

6. The apparatus of claim 1 further comprising:

an electronics portion coupled to said photon transport mechanism, said electronics portion adapted to process said generated photons passed through said photon transport mechanism.

7. The apparatus of claim 1 further comprising:

an interface mechanism adapted to couple said apparatus to said device.

8. A method for determining the orientation of a device with respect to an x-ray source, said method comprising the steps of:

a) coupling a positionally dependent photon source to a device, said positionally dependent photon source generating a differing quantity of photons depending upon its orientation with respect to said x-ray source;

b) subjecting said positionally dependent photon source to x-rays emitted from said x-ray source;

c) measuring an output of said positionally dependent photon source when said positionally dependent photon source is subjected to said x-ray source wherein said output is received from a photon transport mechanism coupled to said positionally dependent photon source; and d) determining the orientation of said device based upon said output measured in step c).

9. The method as recited in claim 8 wherein step a) further comprises coupling a positionally dependent photon source to a device wherein said positionally dependent photon source is comprised of a photon generating material selected from the group consisting of $Gd_2O_2S$, CsI, NaI, and ZnTe.

10. The method as recited in claim 8 wherein step c) further comprises determining the orientation of said device using an electronics portion coupled to said photon transport mechanism, said electronics portion adapted to process said photons which are passed through said photon transport mechanism.

11. The method as recited in claim 8 wherein step d) further comprises determining the rotational orientation of said device based upon said output measured in step c).

12. The method as recited in claim 8 wherein step d) further comprises determining the azimuthal orientation of said device based upon said output measured in step c).

13. The method as recited in claim 8 wherein step d) further comprises determining the rotational and azimuthal orientation of said device based upon said output measured in step c).

14. An apparatus for determining the rotational orientation of a device with respect to an x-ray source, said apparatus adapted to be coupled to said device, said apparatus comprising:

a scintillator portion, said scintillator portion adapted to emit photons upon the absorption of x-rays emitted from said x-ray source;

an x-ray blocking portion coupled to said scintillator portion, said x-ray blocking portion disposed so as to vary the quantity of x-rays which penetrate said scintillator portion when said device to which said apparatus is coupled has a particular rotational orientation with respect to said x-ray source; and a photon transport mechanism coupled to said scintillator portion, said photon transport mechanism adapted to pass said photons emitted from said scintillator portion to a desired location.

15. The apparatus of claim 14 further comprising:

an aluminized portion disposed between said scintillator portion and said x-ray blocking portion, said aluminized portion adapted to increase the number of said emitted photons which pass into said photon transport mechanism.

16. The apparatus of claim 14 further wherein said scintillator portion is comprised of a photon generating material selected from the group consisting of $Gd_2O_2S$, CsI, NaI, and ZnTe.

17. The apparatus of claim 14 further wherein said x-ray blocking portion is comprised of a high Z material.

18. The apparatus of claim 14 wherein said photon transport mechanism is comprised of an optical fiber.

19. The apparatus of claim 14 further comprising:

an electronics portion coupled to said photon transport mechanism, said electronics portion adapted to process said emitted photons which are passed through said photon transport mechanism.

* * * * *